June 4, 1929.  W. P. IMMEL ET AL  1,716,229
CLUTCH
Filed Aug. 3, 1925    4 Sheets-Sheet 1
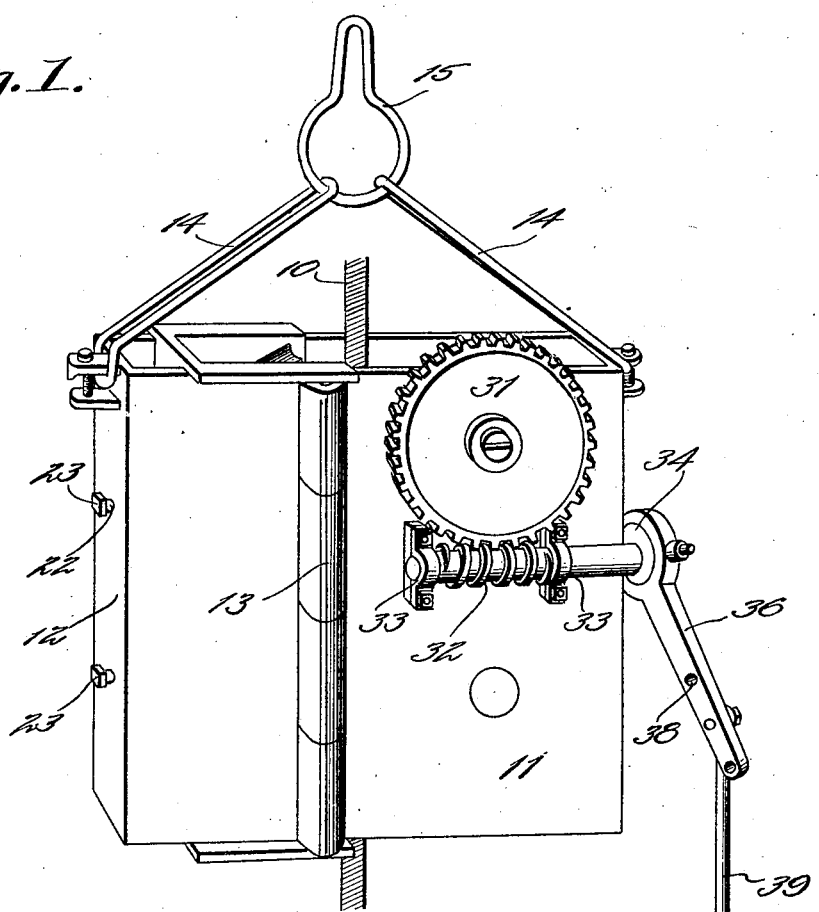
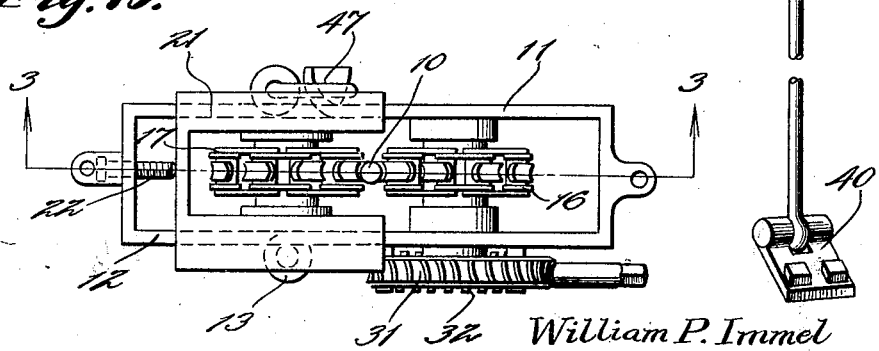
William P. Immel
Clarence J. Martin
INVENTORS
BY Victor J. Evans
ATTORNEY
WITNESS:

June 4, 1929. W. P. IMMEL ET AL 1,716,229
CLUTCH
Filed Aug. 3, 1925  4 Sheets-Sheet 2
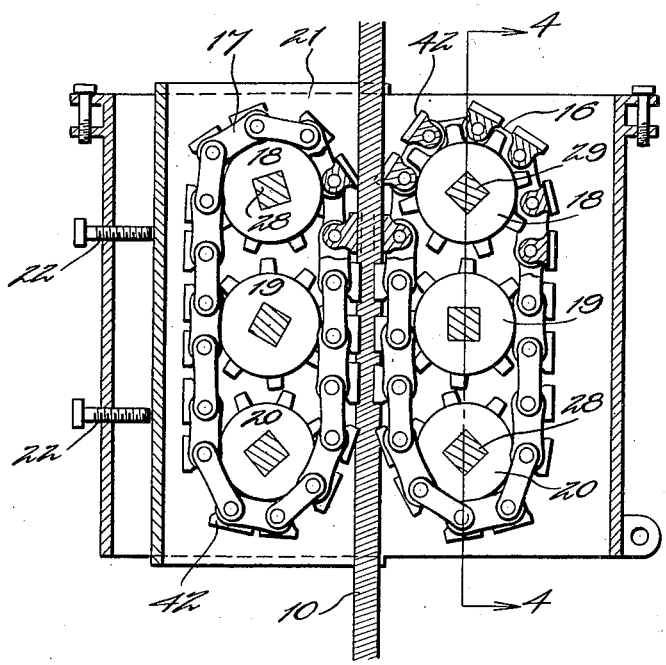
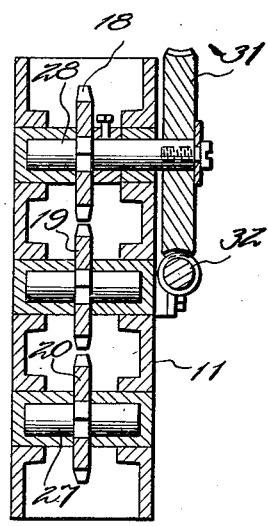
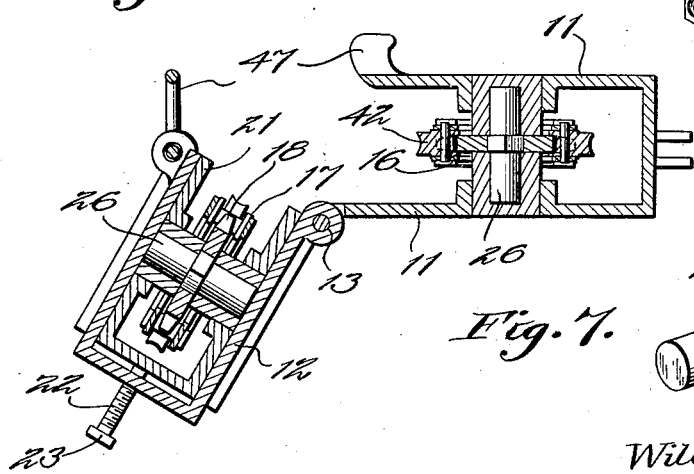
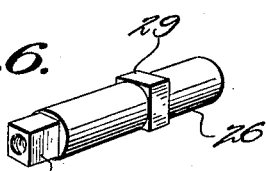
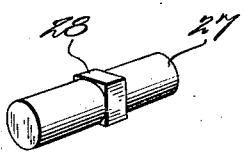
William P. Immel
Clarence J. Martin
INVENTORS
BY Victor J. Evans
ATTORNEY
WITNESS: R. E. Wise June 4, 1929.                W. P. IMMEL ET AL                1,716,229
                                   CLUTCH
                        Filed Aug. 3, 1925         4 Sheets-Sheet 3
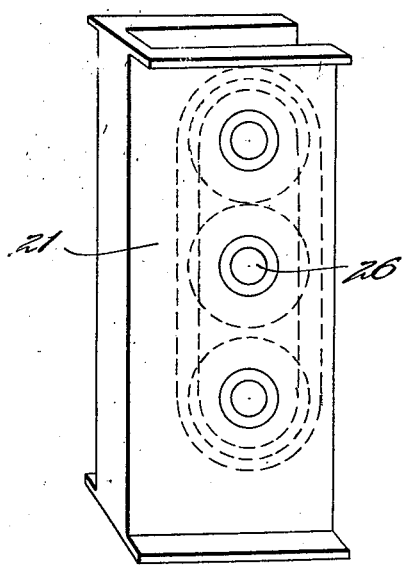
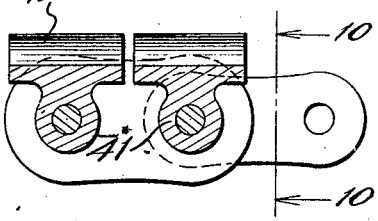
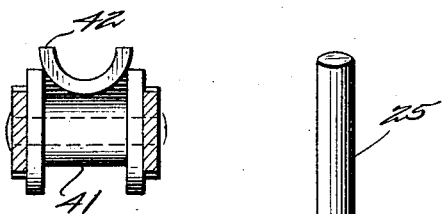
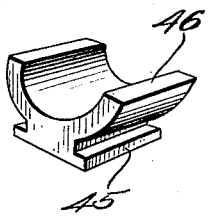
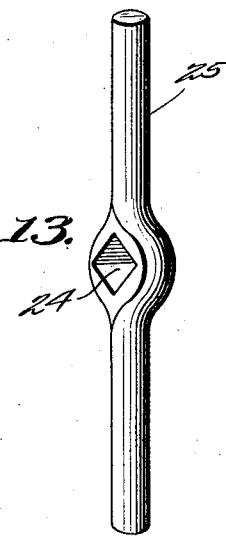
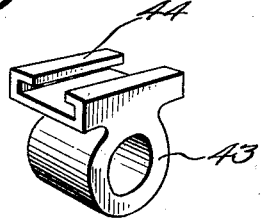
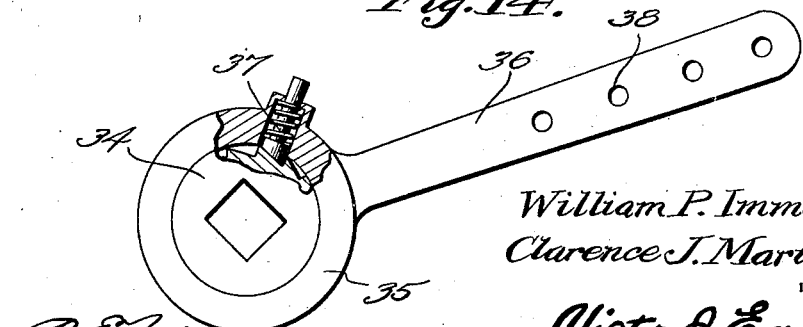
William P. Immel
Clarence J. Martin
INVENTORS
BY *Victor J. Evans*
ATTORNEY
WITNESS:

June 4, 1929.  W. P. IMMEL ET AL  1,716,229
CLUTCH
Filed Aug. 3, 1925  4 Sheets-Sheet 4

William P. Immel
Clarence J. Martin
INVENTOR
BY Victor J. Evans
ATTORNEY

Patented June 4, 1929.

1,716,229

UNITED STATES PATENT OFFICE.

WILLIAM P. IMMEL, OF VERA CRUZ, MEXICO, AND CLARENCE J. MARTIN, OF NEW ORLEANS, LOUISIANA.

CLUTCH.

Application filed August 3, 1925. Serial No. 47,942.

This invention contemplates the provision of a clutch mechanism primarily intended for use with a drilling apparatus, and designed to eliminate the use of various forms of clamps now employed for preventing slipping of the cable.

The chief characteristic of the present invention resides in the provision of a clutch mechanism by means of which slipping of the cable through the negligence of the operator or from any other cause is prohibited, the structure also preventing crystallizing of the cable due to its sliding movement and consequent breaking and loss of time necessary to change the cable, the latter being always under the control of the mechanism.

Other objects and advantages of the invention will appear when the following detailed description is read in connection with the accompanying drawings, the invention, residing in the construction, combination and arrangement of parts as claimed.

In the drawings forming part of this application, like numerals of reference indicate similar parts in the several views, and wherein:

Figure 1 is a view in elevation of the clutch forming the subject matter of the present invention.

Figure 2 is a top plan view.

Figure 3 is a sectional view taken on line 3—3 of Figure 2, looking in the direction of the arrows.

Figure 4 is a sectional view taken on line 4—4 of Figure 3.

Figure 5 is a horizontal sectional view showing how the casing is opened to receive the cable.

Figure 6 is a detail view of the gear operated shaft which supports one of the series of sprocket wheels.

Figure 7 is a detail view of the character of shaft used with the other sprocket wheels.

Figure 8 is a perspective view of the idler box.

Figure 9 is a detail view of a portion of one of the endless chains.

Figure 10 is a sectional view taken on line 10—10 of Figure 9.

Figure 11 is a perspective view of one part of a modified construction of cable clamp.

Figure 12 is a perspective view of the other cooperating part thereof.

Figure 13 is a view of a wrench.

Figure 14 is a perspective view of the pawl and ratchet mechanism.

Figure 15:
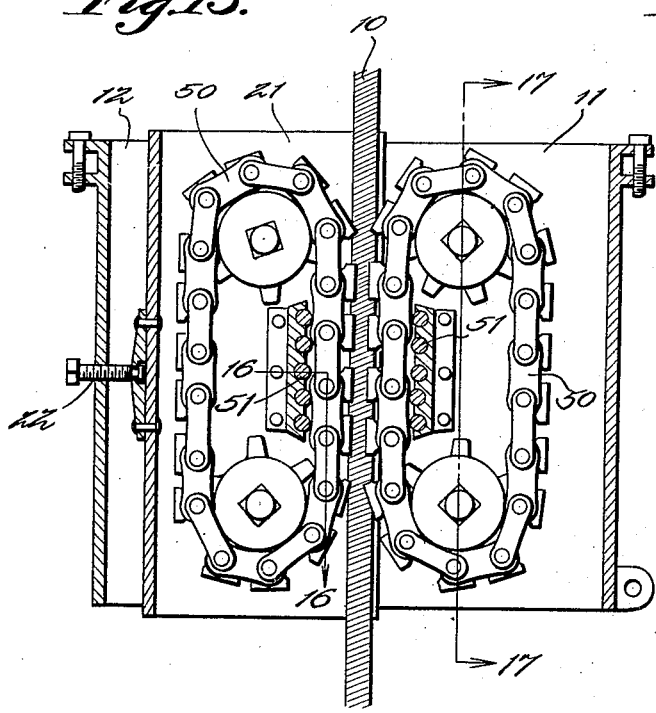
Figure 15 is a view similar to Figure 3 of a modified construction.

As hereinabove stated, the present invention contemplates the provision of a clutch mechanism intended for use with a drilling apparatus, the cable for which is indicated at 10. The invention includes a casing made in two sections 11 and 12 respectively, and these sections are hingedly connected together as at 13, so that the casing can be opened in the manner illustrated in Figure 5 for the purpose of arranging the cable 10 in the position shown in Figure 1. The casing is suspended by means of the links 14 and 15 respectively, and the mechanism is so arranged that when the casing is reciprocated, the cable 10 is effectively engaged and fed through the casing in one direction.

For this purpose we make use of spaced vertically disposed endless chains which are arranged to operate within the said casing and which chains are indicated at 16 and 17 respectively. As shown in Figure 3, the cable 10 is adapted to pass between the adjacent runs of these chains, and is engaged by suitable cable clamps carried by the links of the chains and to be hereinafter specifically described. Each chain is trained over a series of sprocket wheels arranged in spaced superimposed relation, the sprocket wheels for each chain being indicated at 18, 19 and 20. The sprocket wheels for the chain 16 are mounted on shafts journalled in the opposite sides of the section 11 of said casing, while the sprocket wheels for the chain 17 are fixed upon shafts journalled between the opposed sides 21 of what we term an idler box which is mounted for sliding movement within the section 12 of said casing, and capable of being moved toward and away from the cable 10. By reason of this construction, the chain 17 can be moved toward the chain 16 and properly positioned with relation to the latter for the purpose of effectively engaging the cable 10 in a manner to prevent slipping of the cable under any and all circumstances.

The idler box 21 is moved in this direction through the instrumentality of threaded adjusting elements 22 which are supported by the end wall of the section 12 of the casing, each element including the head 23 which is adapted to be received in the opening 24 of a suitable wrench indicated at 25, which is utilized for turning the elements 22 as will be readily understood. In Figures 6 and 7, we have illustrated the character of shafts used in connection with the sprocket wheels above described, the shaft indicated at 26 being used in connection with the sprocket wheel 18 for the chain 16, while all of the other sprocket wheels have associated therewith shafts of the character shown in Figure 7 and indicated at 27. This last mentioned shaft includes squared intermediate portions 28, which support the particular sprocket wheel, while the terminals of the shaft are journalled in the manner above described. The shaft 26 shown in Figure 6 is not only provided with a squared portion 29 for the sprocket wheel mounted thereon, but this shaft projects beyond one side of the section 11 of the casing and is formed with a squared extremity 30 to support the gear 31 in the manner illustrated in Figure 1. It is the shaft 26 that is positively rotated to operate the chains 16 and 17, in order to feed the cable 10 through the casing incident to the operation of the drilling apparatus above referred to.

The gear 31 forms part of the means utilized to operate the mechanism, and which means further includes a worm gear 32 journalled in suitable bearings 33 secured to the casing immediately beneath the gear 31. This worm gear projects beyond the end wall of the casing and has a squared extremity to accommodate a ratchet disk 34 as shown in Figure 14. Receiving this disk 34 is the annular portion 35 of a lever 36, and carried by the annular portion 35 is a spring pressed bolt 37 which cooperates with the ratchet disk 34 to turn the gear 32 in one direction while the casing is being reciprocated incident to the operation of the drilling apparatus. The lever 36 is provided with a plurality of openings 38 suitably spaced apart, to provide for an adjustment between the lever and the rod 39 which has one end connected with said lever and its other end pivoted to a base plate 40 which is adapted to be bolted or otherwise secured to a suitable support. Manifestly, as the casing is reciprocated, the lever 26 is oscillated and rotation of the worm gear 32 effected. The gear 32 rotates the gear 31 in a direction to cause the chains 16 and 17 to engage the cable 10 and feed it through the casing in one direction.

For the purpose of effectively engaging the cable 10 to feed the latter in a manner described and at the same time prevent slipping of the cable under any and all conditions, we make use of what we term cable clamps which may be of any suitable construction preferably of the design shown in Figures 9 to 12 inclusive. In Figures 9 and 10, it will be noted that each clamp includes a spool like body portion 41 which is adapted to be associated with each link of each chain, and the body portion supporting the semi-cylindrical like portion 42 is so arranged that when the chains are in operation, the corresponding clamps carried by the adjacent runs of the respective chains will effectively clamp the cable for the purpose specified. In Figures 11 and 12, we have shown a modified form of the clamp which is made up in two sections, one section including a spool like body portion 43 for association with the links of the chain and which body portion supports the tapered channel member 44. This member is adapted to slidably receive the tapered base 45 of the other part of the clamp which includes the semi-cylindrical like portion 46. These clamps when associated with the chains are used in the same manner above described in connection with the clamp shown in Figures 9 and 10.

In practice, the casing is opened in the manner shown in Figure 5, and the cable of the drilling apparatus placed between the sections. The casing is then closed and the sections held immovably associated by means of a suitable connection indicated generally at 47 in Figure 5. The idler box 21 is then adjusted through the instrumentality of the elements 22 to properly position the chain 17 with relation to the chain 16 to effectively engage the cable 10 for the purpose above stated. When the drilling apparatus is put into operation, the said casing is reciprocated, and it is during this operation that the worm screw 32 is rotated or turned in one direction by means of the lever 36 and the pawl and ratchet mechanism described. The chains being equipped with clamps manifestly grip or hold the cable from slipping without requiring the attention of the operator, the cable at all times being under the control of the clutch mechanism. The invention is very simple and can be manufactured in any size suitable to the work to be performed.

Figure 17:
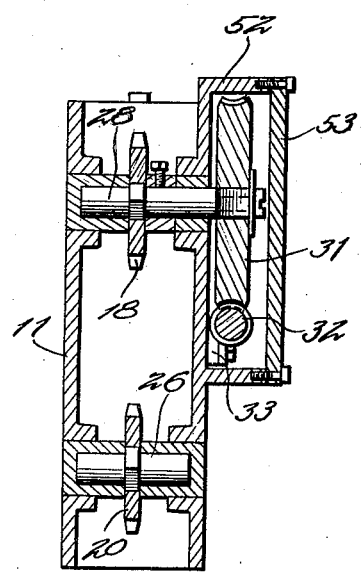
Figure 17 is a view taken on line 17—17 of Figure 15.
Figure 16:
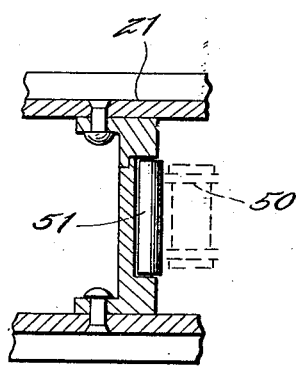
Figure 16 is a view taken on line 16—16 of Figure 15.

In Figure 15 we have illustrated a modified form of the invention, which differs from the preferred form in that the adjacent runs of the endless chains 50 cooperate with roller bearings 51, as clearly shown in Figure 15. There is a series of these roller bearings for each endless chain, and arranged to hold the chain in effective clamping engagement with the rope 10. Manifestly, the roller bearings 15 are used in place of the intermediate sprocket wheel 19, shown in Figure 3 of the preferred form of the invention. As shown in Figure 17, the gears 31 and 32 are adapted to be arranged in a suitable casing 52, and this casing is provided with a removable cover 53 so that access may be had to the gears for any purpose whatsoever.

While it is believed that from the foregoing description, the nature and advantages of the invention will be readily apparent, we desire to have it understood that we do not limit ourselves to what is herein shown and described, and that such changes may be resorted to when desired as fall within the scope of what is claimed.

Having thus described the invention, we claim:

1. In a clutch mechanism of the character described, a casing, including two pivotally connected sections, means for normally holding the sections fixed against pivotal movement, an endless chain arranged to operate within one of said sections, an idler box arranged within the other section and capable of adjustment, and endless chain operating within said box and arranged in spaced parallel relation with the first mentioned chain, said chains being adapted to engage a cable between the adjacent runs thereof, cable clamps carried by each chain, and means for operating said chains to feed the cable in one direction.

2. In a clutch mechanism of the character described, a casing including two pivotally connected sections whereby said casing can be opened to receive a cable, means for holding the sections of said casing closed, an endless chain arranged to operate with one section of the casing, an idler box arranged within the other section and capable of sliding movement, an endless chain arranged to operate in said box and disposed in spaced parallel relation with the first mentioned chain, means supported by said casing for adjusting said box and its chain into operable relation with the first mentioned chain to clamp said cable between the adjacent runs of the respective chains, cable clamps carried by each chain, and means for operating said chains to feed the cable in one direction through the casing.

3. A clutch mechanism of the character described comprising a casing adapted to be reciprocated, spaced endless chains arranged to operate therein and adapted to engage the cable between the adjacent runs of said chains, sprocket wheels for each of said chains, means for operating said chains to feed the cable in one direction through the casing, cable clamps carried by each chain, said means including a gear supported by the axle of one of said sprocket wheels, a worm gear journalled on said casing and meshing with the first mentioned gear, a lever for rotating said worm gear in one direction, a pawl and ratchet mechanism connecting the lever with said gear, and a rod having one end secured to the lever, and the other end fixed whereby said lever is oscillated to operate the chains when the casing is reciprocated.

4. A clutch mechanism of the character described comprising a casing, spaced endless chains arranged to operate therein, and adapted to engage a cable between the adjacent runs thereof, clamping members carried by the links of each chain, an idler box arranged within the casing and capable of adjustment to properly position the adjacent runs of the chains, the corresponding members of the respective chains unitedly gripping the cables as they approach the latter, and means for operating said chains to feed the cable in one direction.

In testimony whereof we affix our signatures.

WILLIAM P. IMMEL.
CLARENCE J. MARTIN.